(12) United States Patent
Bauerschmidt et al.

(10) Patent No.: US 11,029,464 B2
(45) Date of Patent: Jun. 8, 2021

(54) HOLLOW-CORE PHOTONIC CRYSTAL FIBER AND METHOD OF MANUFACTURING THEREOF

(71) Applicant: Max-Planck-Gesellschaft zur Förderung der Wissenschaften e.V., Munich (DE)

(72) Inventors: Sebastian Thomas Bauerschmidt, Wendelstein (DE); Patrick Sebastian Uebel, Marloffstein (DE); Philip St. J. Russell, Röttenbach (DE)

(73) Assignee: Max-Planck-Gesellschaft zur Förderung der Wissenschaften e.V., Munich (DE)

( * ) Notice: Subject to any disclaimer, the term of this patent is extended or adjusted under 35 U.S.C. 154(b) by 0 days.

(21) Appl. No.: 16/611,350

(22) PCT Filed: May 7, 2018

(86) PCT No.: PCT/EP2018/061674
§ 371 (c)(1),
(2) Date: Nov. 6, 2019

(87) PCT Pub. No.: WO2018/210598
PCT Pub. Date: Nov. 22, 2018

(65) Prior Publication Data
US 2020/0166699 A1    May 28, 2020

(30) Foreign Application Priority Data
May 17, 2017 (EP) ..................... 17171468

(51) Int. Cl.
*G02B 6/02* (2006.01)
*G02B 6/255* (2006.01)

(52) U.S. Cl.
CPC ..... *G02B 6/02328* (2013.01); *G02B 6/02304* (2013.01); *G02B 6/2552* (2013.01)

(58) Field of Classification Search
CPC ............ G02B 6/02328; G02B 6/02376; G02B 6/02304
See application file for complete search history.

(56) References Cited

U.S. PATENT DOCUMENTS

| | | | |
|---|---|---|---|
| 8,244,086 | B2 | 8/2012 | Digonnet et al. |
| 8,306,379 | B2 | 11/2012 | Benabid et al. |

(Continued)

FOREIGN PATENT DOCUMENTS

| | | |
|---|---|---|
| CN | 101836143 A | 9/2010 |
| CN | 103080796 A | 5/2013 |

(Continued)

OTHER PUBLICATIONS

International Search Report and Written Opinion of the International Searching Authority directed to related International Patent Application No. PCT/EP2018/061674, dated Jul. 25, 2019; 11 pages.

(Continued)

*Primary Examiner* — Omar R Rojas
(74) *Attorney, Agent, or Firm* — Sterne, Kessler, Goldstein & Fox P.L.L.C.

(57) ABSTRACT

A hollow-core photonic crystal fiber (HC-PCF) (10) for guiding at least one mode of a light field (1) along a mode guiding section (11) of the HC-PCF (10), comprises an outer jacket (12), an inner cladding (13) and a hollow core (14), which extend along the HC-PCF (10), wherein the inner cladding (13) is arranged on an interior surface of the outer jacket (12) and comprises anti-resonant structures (15) surrounding the hollow core (14), and the hollow core (14) has a mode guiding core diameter (d) provided along the mode (Continued)

guiding section of the HC-PCF (10), and wherein at least one fiber end (16) of the HC-PCF (10) has a light field coupling section (17) in which the hollow core (14) is tapered over an axial coupling section length from a fiber end core diameter (D) at the at least one fiber end (16) to the mode guiding core diameter (d). Furthermore, methods of using the HC-PCF and manufacturing the HC-PCF are described.

16 Claims, 4 Drawing Sheets

(56) References Cited

U.S. PATENT DOCUMENTS

| | | | |
|---|---|---|---|
| 8,903,214 | B2 | 12/2014 | Alkeskjold |
| 10,393,956 | B2 * | 8/2019 | Russell .............. G02B 6/02366 |
| 2008/0061657 | A1 | 3/2008 | Matsuda et al. |
| 2011/0273712 | A1 | 11/2011 | Digonnet et al. |

FOREIGN PATENT DOCUMENTS

| | | |
|---|---|---|
| CN | 104007508 A | 8/2014 |
| CN | 105807363 A | 7/2016 |
| EP | 1 153 324 A1 | 11/2001 |
| EP | 1 153 324 B1 | 8/2003 |
| EP | 1 153 324 B2 | 3/2007 |
| JP | 2003-255249 A | 9/2003 |
| WO | WO 00/49435 A1 | 8/2000 |
| WO | WO 2004/001461 A1 | 12/2003 |
| WO | WO 2011/018094 A1 | 2/2011 |
| WO | WO 2015/185761 A1 | 12/2015 |

OTHER PUBLICATIONS

Wheeler et al., "Large-core acetylene-filled photonic microcells made by tapering a hollow-core photonic crystal fiber," Optical Society of America, Optics Letters, vol. 35, No. 11, Jun. 1, 2010; pp. 1875-1877.

Uebel et al., "Broadband robustly single-mode hollow-core PCF by resonant filtering of higher-order modes," Optical Society of America, Optics Letters, vol. 41, No. 9, May 1, 2016; pp. 1961-1964.

Benabid et al., "Stimulated Raman Scattering in Hydrogen-Filled Hollow-Core Photonic Crystal Fiber," Science, vol. 298, No. 298, Oct. 11, 2002; pp. 399-402.

Russell et al., "Hollow-core photonic crystal fibres for gas-based nonlinear optics," Nature Photonics, vol. 8, Apr. 2014, pp. 278-286.

International Preliminary Report on Patentability and Written Opinion of the International Searching Authority directed to related International Patent Application No. PCT/EP2018/061674, dated Nov. 19, 2019; 8 pages.

Couny et al., "Generation and Photonic Guidance of Multi-Octave Optical-Frequency Combs," *Science*, vol. 318, Nov. 16, 2007; pp. 1118-1121.

Dash et al., "Fabrication of Inline Micro Air Cavity With Choice-Based Dimensions," *IEEE Photonics Technology Letters*, vol. 29, No. 14, Jul. 15, 2017; pp. 1147-1150.

Yu et al., "Numerical Analysis of a Novel Refractive Index and Temperature Sensor Based on a Kagomé Hollow-Core Photonic Crystal Fiber," 2016 *IEEE Sensors*, 2016; pp. 1-3.

Search Report directed to related Japanese Patent Application No. 2019-560113, dated Sep. 28, 2020; 15 pages.

Wang et al., "Low loss broadband transmission in hypocycloid-core Kagome hollow-core photonic crystal fiber," Optical Society of America, Optics Letters, vol. 36, No. 5, Mar. 1, 2011; pp. 669-671.

Huang et al., "Hollow core anti-resonant fiber with split cladding," Optical Society of America, Optics Express, vol. 24, No. 7, Mar. 31, 2016; pp. 7670-7678.

Pearce et al., "Models for guidance in kagome-structured hollow-core photonic crystal fibres," Optical Society of America, Optics Express, vol. 15, No. 20, Sep. 18, 2007; pp. 12680-12685.

Zhou et al., "The beam combination of multi-core photonic crystal fiber by using the Kagome fiber," Acta Physica Sinica—Chinese Edition, vol. 65, No. 2, Jan. 2016; 6 pages.

\* cited by examiner

HOLLOW-CORE PHOTONIC CRYSTAL FIBER AND METHOD OF MANUFACTURING THEREOF

BACKGROUND OF THE INVENTION

Field of the Invention

The invention relates to a hollow-core photonic crystal fiber (HC-PCF), in particular of non-bandgap type (or: hollow-core anti-resonant-reflecting fibre, HC-AF), in particular having an axial hollow core and an inner cladding region comprising an arrangement of anti-resonant structures surrounding the core, and being configured in particular for guiding at least one mode of a light field. Furthermore, the invention relates to methods of using the HC-PCF and manufacturing the HC-PCF. Applications of the invention are available e. g. in the fields of optical metrology, spectroscopy, scientific research and light guiding.

Description of Related Art Including Information Disclosed Under 37 CFR 1.97 and 1.98

In the present specification, reference is made to the following prior art illustrating the technical background of the invention:
P. Uebel et al. in "Opt. Lett." 41, 1961-1964 (2016);
F. Benabid et al. in "Science" 298, 399-402 (2002);
WO 2015/185761 A1;
P. St. J. Russell et al. in "Nature Photonics" 8, 278-286 (2014); and
EP 1 153 324 B2.

BRIEF SUMMARY OF THE INVENTION

Gas-filled hollow-core photonic crystal fibers are a technology platform for a new generation of high-brightness light sources with potential applications e. g. in metrology and spectroscopy. FIG. 8 (prior art) schematically shows the concept of such a light source 100' based on nonlinear optics in a gas-filled HC-PCF 10'. The HC-PCF 10' includes an outer jacket 12', an inner cladding 13' and a hollow core 14' (see longitudinal cross-section of HC-PCF 10' in top of FIG. 8). The inner cladding 13' comprises anti-resonant structures 15', like a single ring arrangement of tube-shaped capillaries axially extending along the HC-PCF 10' and surrounding the hollow core 14' as exemplified in the cross-sectional scanning electron microscope (SEM) image of FIG. 9 (prior art) and disclosed e. g. in [1]. Other fiber structures can be more complex, such as Kagome-type or nested structures [2, 3].

A pulse light field 1' from a pump source 20' is launched at the incoupling end into the core 14' of the HC-PCF 10' and excites predominantly the fundamental transverse mode which is guided towards the outcoupling end. The HC-PCF 10' is placed in a gas cell 30' providing a controlled gas environment (e.g. noble gases or Raman-active gases) at typical pressures of up to several 10's of bar and having transparent windows 31' for transmitting the light. The interplay between waveguide dispersion of the HC-PCF 10' and nonlinearity of the gas result in a strong modification of the pump pulse light field 1', which include e. g. pulse compression and spectral broadening [4] and/or other optically non-linear effects.

While the operation of the light source 100' of FIG. 8 has been proved in experiments, the following substantial disadvantage has been found. Lifetime tests by the inventors reveal that the average output power strongly degrades at a pump dose of already a few 10 Wh of exposure, severely limiting the usability of the HC-PCF-based light source 100' in practical routine applications. As a further disadvantage, the conventional HC-PCF can have a restricted launch efficiency when starting the nonlinear operation of the HC-PCF 10'.

The objective of the invention is to provide an improved hollow-core photonic crystal fiber and methods of manufacturing thereof being capable of avoiding disadvantages of conventional techniques. In particular, the HC-PCF is to be suitable for a linear or nonlinear operation with increased lifetime and/or increased light power and/or with improved launch efficiency. Furthermore, the HC-PCF is to be manufactured with uncomplicated processes.

These objectives are correspondingly solved by a HC-PCF and a method of manufacturing thereof comprising the features of the independent claims, respectively. Preferred embodiments and applications of the invention arise from the dependent claims.

According to a first general aspect of the invention, the above objective is solved by a HC-PCF having an outer jacket, an inner cladding and a hollow core, which extend along the axial length of the HC-PCF. The hollow core surrounded by the inner cladding provides a mode guiding section of the HC-PCF for guiding at least one mode, e. g. the fundamental transverse mode, of a light field (pump field) coupled at an incoupling end to the HC-PCF. The outer jacket is made of a solid material and the inner cladding is supported by an interior surface of the outer jacket. The inner cladding comprises anti-resonant structures extending along the axial length of the HC-PCF and delimiting the hollow core. Along the mode guiding section of the HC-PCF, the hollow core has a mode guiding core diameter (d). The mode guiding core diameter is the inscribed circular cross-sectional dimension of the hollow core inner clearance. Accordingly, the mode guiding section is adapted for guiding a light field with a certain central wavelength, i.e. there is a mutual relationship of the central wavelength of the light field and the corresponding focussing properties and in particular the mode guiding core diameter.

According to the invention, at least one fiber end of the HC-PCF has a light field coupling section in which the hollow core is tapered over an axial coupling section length from a fiber end core diameter (D) at the at least one fiber end to the mode guiding core diameter (d). The fiber end core diameter is a cross-sectional dimension of the hollow core inner clearance at the fiber end opening, and it is larger than the mode guiding core diameter.

The inventors have found that the lost in output power of conventional HC-PCFs is a result of a degradation of the fiber input face (opening of fiber end), in particular when using high power pump fields. The transverse structure of the conventional HC-PCF is typically constant along the fiber length. During a nonlinear experiment with low exposure to pump energy (e.g. a few Wh) the structure of the input side remains unchanged, i.e. no noticeable difference can be observed in a SEM. However, lifetime tests by the inventors reveal strong degradation of the fiber input face at a pump dose of already a few 10 Wh of exposure. Degradation limits the incoupling efficiency of the pump field, so that the output power of the HC-PCF is limited accordingly. The input face degradation is a result of field enhancement at the glass-gas boundary and plasma-based erosion caused by the strong sudden overlap of the pump field with the inner cladding of the conventional HC-PCF.

On the contrary, the light field coupling section at the at least one fiber end of the inventive HC-PCF provides another structure compared with the fiber end of a conventional HC-PCF being manufactured with a constant inner diameter at the fiber end. With the inventive provision of the light field coupling section, a smooth transition from zero or negligible field overlap between the pump field and the inner jacket, made of e. g. glass, at the fiber end to the mode overlap in the mode guiding section is created, resulting in reduced field enhancement and suppressed plasma-based erosion. Zero or negligible field overlap means that intensity of the pump field portions reaching the inner jacket is zero or below a critical intensity causing an inner jacket erosion. Advantageously, no degradation of the inventive HC-PCF is observed even for pump doses above 1000 Wh and the lifetime of the HC-PCF is increased accordingly. In addition to the enhanced lifetime, the launch efficiency was found to improve by a few % compared to the conventional HC-PCF.

According to second general aspect of the invention, the above objective is solved by methods of using the HC-PCF according to the first general aspect of the invention. The input light field parameters, in particular the intensity, central wavelength, focusing geometry and beam diameter thereof, are selected and the HC-PCF is dimensioned such that the HC-PCF can be operated without a degradation of the at least one fiber end. According to a first preferred application (non-linear operation), the inventive HC-PCF is used for subjecting a light field to an optically non-linear process, in particular spectral broadening and/or pulse compression. Preferably, a light source for generating broadband output pulses (in particular covering a spectral range from the vacuum or deep ultraviolet (UV) to the near infrared (IR)) is provided which includes a pump source and the HC-PCF. The light source including the inventive HC-PCF is considered as a further independent subject of the invention.

According to a second preferred application (linear operation) of the invention, the HC-PCF is used for guiding a light field to an application site, e. g. for material processing.

According to third general aspect of the invention, the above objective is solved by a method of manufacturing the HC-PCF according to the first general aspect of the invention. The manufacturing method comprises the steps of providing a HC-PCF including the outer jacket, the inner cladding and the hollow core and forming an inner jacket tapering for providing the light field coupling section at at least one fiber end by a thermal treatment of the HC-PCF. Advantageously, the inventive HC-PCF is fabricated by locally heating the fibre to the softening point of the fiber material, preferably glass. Because of surface tension, the inner jacket structure, e. g. the capillaries thereof, tends to collapse while preferably the outer diameter of the HC-PCF almost remains unchanged.

According to a preferred embodiment of the invention, the anti-resonant structures have a cross-sectional dimension which gradually increases in the light field coupling section from the fiber end opening towards the mode guiding section. Advantageously, this embodiment of the HC-PCF has a modified structure of the inner cladding in the light field coupling section, while the outer diameter of the HC-PCF is constant along the light field coupling section, so that a modification of the outer jacket is avoided and e. g. coupling of the HC-PCF with a holding carrier is not affected.

According to a further preferred embodiment of the invention, the fiber end core diameter and the axial coupling section length of the light field coupling section are selected such that a field overlap of the inner cladding and the light field to be focussed to the hollow core for guiding by the HC-PCF is excluded or negligible at the fiber end opening. Advantageously, this provides a smooth transition to the field overlap of the inner cladding and the light field in the mode guiding section. Preferably a pump source and an optical setup are configured for maximum coupling efficiency of the light to the mode guiding section of the HC-PCF.

Advantageously, the light field coupling section can be characterized by at least one of the parameters including the axial coupling section length and an axial transition length. The axial coupling section length is the overall length of the light field coupling section. The light field coupling section preferably is characterized by the axial transition length, which is a fiber length over which the fiber core diameter dimension reduces in the light field coupling section from the fiber end core diameter (D) to (0.5*(D+d)).

The axial transition length preferably has a lower limit of at least 0.5 times the mode guiding core diameter (d) and/or an upper limit of at most 0.5 times a transition dimension $(\pi(D_2 d_2 - d^4)^{0.5}/(4\lambda))$, where $\lambda$ is the central wavelength of the pump light field. These limits of the axial transition length have advantages in terms of a minimized but effective transition from the fiber end core diameter to the mode guiding core diameter. With the upper limit, the light field coupling section differs in particular from conventional up-tapering of optical fibers (described e. g. in [5]) which is designed for an adiabatic transition of the free space beam to the guided mode. Particularly preferred, the axial transition length is at least 10 µm and/or at most 1000 µm.

The axial coupling section length preferably has a lower limit of at least the mode guiding core diameter (d) and/or an upper limit of at most the transition dimension $(\pi(D^2 d^2 - d^4)^{0.5}/(4\lambda))$. Particular advantages for practical applications of the invention are obtained if the axial coupling section length of the light field coupling section is at least 20 µm and/or at most 5000 µm.

Preferably, the light field coupling section is configured such that no sharp (step- or blade shaped) edges of the inner cladding are exposed to the input pump field. Advantageously, field enhancements at edges of the inner cladding are avoided. However, it is not necessary to remove any sharp edges of the anti-resonant structures, in particular when they are moved out of the region with critical light field intensities.

According to a further preferred embodiment of the invention, the inner cladding extends to the opening of the at least one fiber end. Advantageously, a compact size of the light field coupling section is obtained. Alternatively, the inner cladding does not extend to the opening of the at least one fiber end. In other words, the inner cladding can be provided with an axial distance from the opening of the at least one fiber end. Advantageously, this allows a reduction of the inner cladding with a thickness down to zero within the HC-PCF.

The advantage of suppressing fiber end degradation is obtained not only at the incoupling fiber end of a HC-PCF, but also at the outcoupling end thereof. Thus, according to the invention, the light field coupling section can be provided at at least one of the incoupling and outcoupling fiber ends, e. g. at both ends. Preferably, the light field coupling section is provided exclusively at the incoupling end of the HC-PCF, so that the manufacturing of the HC-PCF is simplified in an advantageous manner.

According to a preferred variant of the HC-PCF manufacturing method, a length of a HC-PCF is thermally treated at at least one fiber section arranged with a distance from the ends of this HC-PCF. Due to the thermal treatment, tapering of the inner jacket is formed along the length of the HC-PCF. Subsequently, the HC-PCF is cut in the at least one thermally treated fiber section, e. g. in the centre thereof, and with a distance from the at least one thermally treated fiber section to a predetermined fiber length for forming the light field coupling section at the at least one fiber end. With the preferred provision of the light field coupling section at the incoupling end, the incoupling end is then prepared by carefully cleaving in the transition region to produce a high quality end-face. According to an alternative variant of the HC-PCF manufacturing method, the HC-PCF is cut to a predetermined fiber length to be obtained, and at least one fiber end of the cut HC-PCF is subjected to the thermal treatment for forming the light field coupling section at the at least one fiber end.

Appropriate thermal treatment conditions can be found by tests or numerical simulations of the thermal inner cladding deformation in response to heating, e. g. by surface tension. In particular, the thermal treatment conditions include the treatment temperature and a distribution thereof along a treatment range for forming the taper geometry to be obtained.

Preferably, the thermal treatment comprises a heating of the HC-PCF at the at least one fiber section or at the at least one fiber end, e. g. by laser irradiation, arc discharge, or by an external resistance heater, such that the resonant structures of the inner cladding are softened and the light field coupling section is formed by the effect of surface tension in the softened anti-resonant structures. Simultaneously with a contraction of the anti-resonant structures, the wall thickness thereof is increased. Additionally, a vacuum can be applied to the HC-PCF, in particular in the in anti-resonant structures of the inner cladding and the light field coupling section is formed by the combined effect of surface tension in the softened anti-resonant structures and the applied vacuum. Additionally or alternatively, an inner pressure can be applied in the mode guiding core, so that the light field coupling section is formed by the combined effect of surface tension in the softened anti-resonant structures and the applied pressure.

BRIEF DESCRIPTION OF THE DRAWINGS

Further details and advantages of the invention are described in the following with reference to the attached drawings, which show in.

DETAILED DESCRIPTION OF THE INVENTION

Features of preferred embodiments of the invention are described in the following with reference to the provision of a light field coupling section at the input fiber end of a HC-PCF. The invention can be correspondingly implemented with a light field coupling section at the output fiber end or at both ends of the HC-PCF. Exemplary reference is made to a HC-PCF, wherein the inner cladding is formed by a single ring arrangement of tube-shaped capillaries. The invention can be correspondingly implemented with other anti-resonant structures, like Kagome-type or nested structures.

Figure 1:
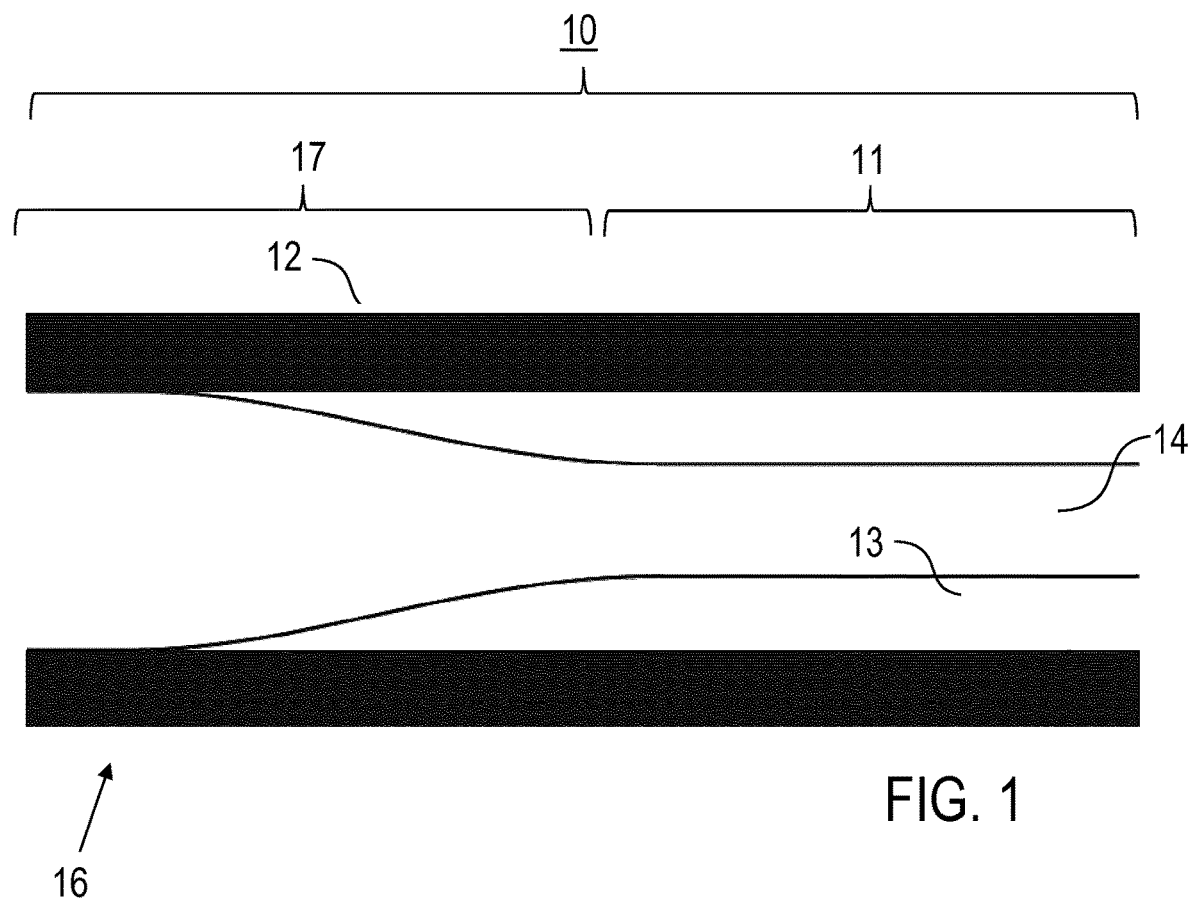
FIG. 1: a schematic cross-sectional view of a HC-PCF according to a preferred embodiment of the invention.
Figure 2:
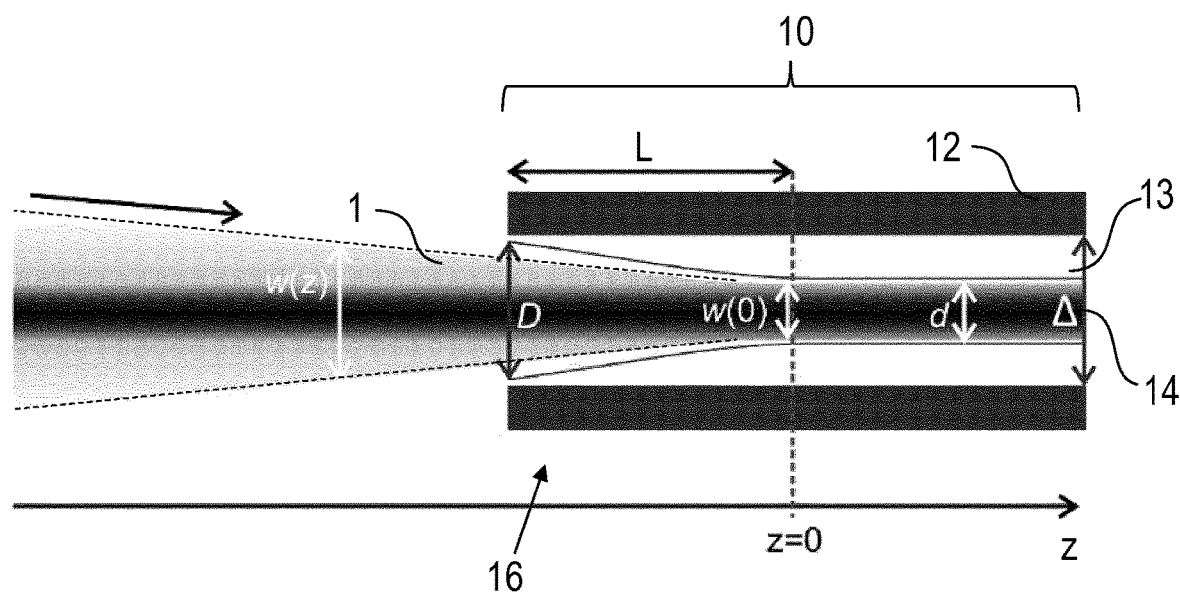
FIG. 2: a schematic cross-sectional view of a HC-PCF according to a further embodiment of the invention with an illustration of the pump light field.

FIGS. 1 and 2 show schematic enlarged cross-sectional views of HC-PCFs 10 according to preferred embodiments of the invention. FIG. 2 illustrates a Gaussian beam (input light field 1) being focused and coupled to the HC-PCFs 10 (shown with the input fiber end only). For practical applications, the HC-PCFs 10 have a longer axial extension than shown in FIGS. 1 and 2, which, depending on the function of the HC-PCF 10, is selected in a range from e. g. 1 cm to 5 m or even more.

The HC-PCF 10 comprises an outer jacket 12 being made of e. g. quartz glass with a thickness of e. g. 30 μm and an inner diameter A of e. g. 60 μm, an inner cladding 13 comprising anti-resonant structures 15, and a hollow core 14 being provided by the space between the anti-resonant structures. The anti-resonant structures comprise e. g. a single ring arrangement of five capillaries as illustrated with reference to the conventional technique in FIG. 9. The capillaries are made of quartz glass with a thickness of e. g. 0.1 μm to 1 μm or even more. The inner cladding 13 is supported by the interior surface of the outer jacket 12. The HC-PCF 10 includes a mode guiding section 11 wherein the hollow core 14 has a mode guiding core diameter d, e. g. 30 μm.

Figure 9:
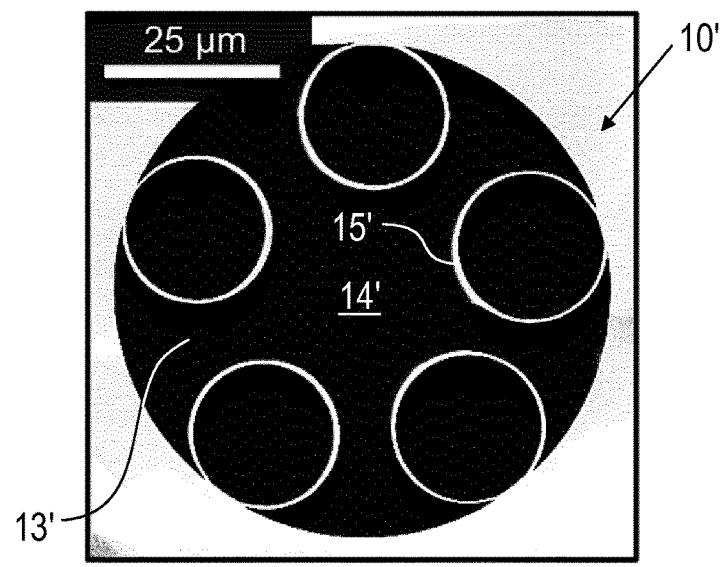

At the input fiber end 16 of the HC-PCF 10, a light field coupling section 17 is provided. The light field coupling section 17 has an axial coupling section length L, along which the inner diameter of the HC-PCF 10 is reduced from the fiber end core diameter D to the mode guiding core diameter d. With an example of a HC-PCF 10 with a mode guiding core diameter of 30 μm, the axial coupling section length preferably is equal to or below 300 μm. For larger mode guiding core diameters, e. g. equal to or above 50 μm, the axial coupling section length can be at least 1 mm, in particular some mm. The inner cladding 14 capillaries 15 form a smooth transition from partially collapsed (FIG. 3B) to their dimensions in the untreated fiber structure (FIG. 9).

The theoretical maximum axial coupling section length L of the light field coupling section 17 can be derived from the focusing properties of a Gaussian laser beam (input light field 1) as follows. The focused laser beam is characterized by its beam diameter w(z) (z: beam propagation direction and axial direction of HC-PCF 10, see FIG. 2 in the region where z<0), its central wavelength A, and its focal diameter $w_0=w(0)$. w(z) can be calculated via:

$$w(z)=w_0(1+(z/z_R)^2)^{0.5},$$

where $z_R=\pi w_0^2/(4\lambda)$ is the Rayleigh length.

To reduce the light overlap at the fiber end, the axial coupling section length L and the end diameter D of the light field coupling section have to be chosen such that w(−L)<D, i.e.

$$D>w(-L)\approx d(1+(L/z_R)^2)^{0.5}\approx d(1+(4L\lambda/(\pi d^2))^2)^{0.5}$$

where d≈$w_0$. Solving this equation for L yields:

$$L < \pi(D^2d^2-d^4)^{0.5}/(4\lambda)$$

The length restriction preferably is extended with a length limit for section that is facing the fiber end and where the initial core diameter D is reduced to 0.5*(D+d), i.e. to 50% of the total reduction. Preferably, this length (so called axial transition length) is shorter than 0.5 times $$\pi(D^2d^2-d^4)^{0.5}/(4\lambda).$$

Figure 3:
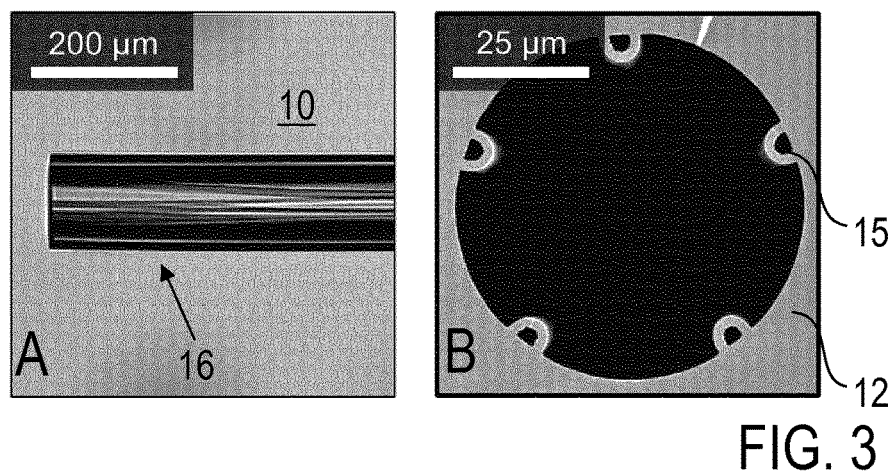
FIG. 3: images of a fiber end of an inventive HC-PCF, including an optical micrograph (A) and a SEM image (B)

FIG. 3 shows images of a practical example of an inventive HC-PCF. FIG. 3A is an optical micrograph of the input fiber end 16, wherein the in the light field coupling section has a length of approx. 250 μm. FIG. 3B is a SEM image of the input face with the outer jacket 12 and the anti-resonant structures 15. The essential advantage of the invention is represented by FIG. 3B: the anti-resonant structures 15 are shown after a lifetime test (see also FIGS. 4 and 5), and there is no visible sign of degradation.

Figure 4:
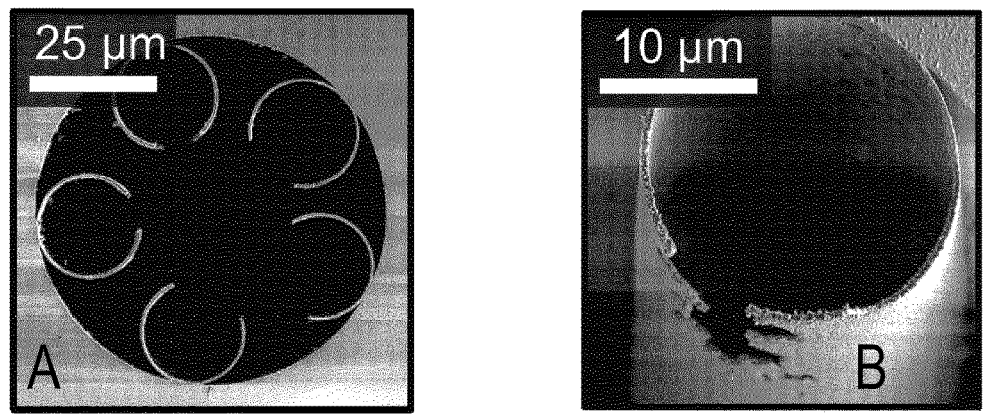
FIG. 4: SEM images of the input side of degraded conventional HC-PCFs.
Figure 5:
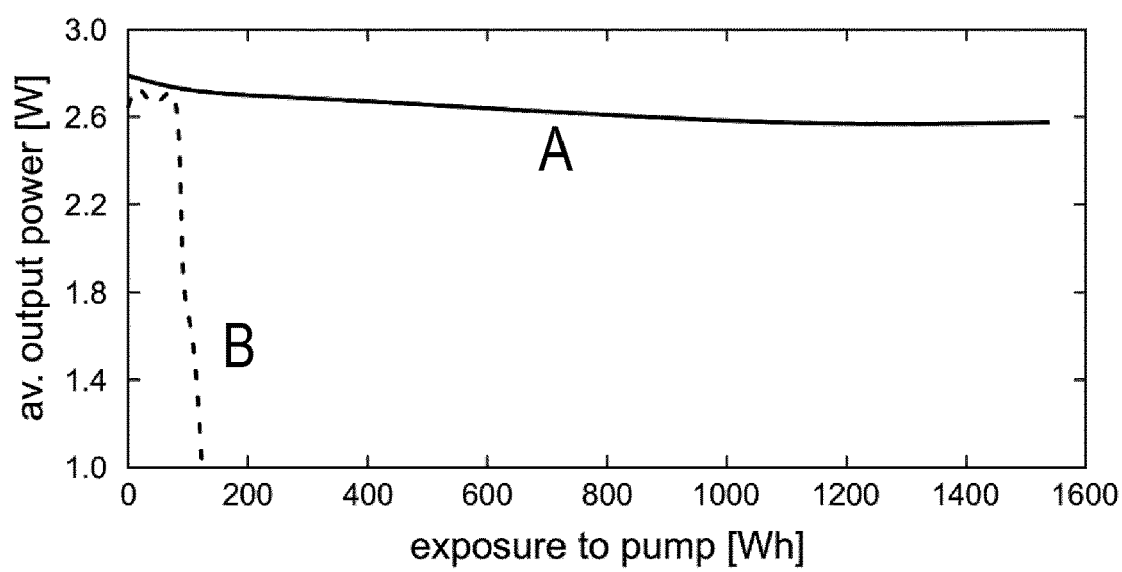
FIG. 5: experimental results of measuring a HC-PCF output power of an inventive HC-PCF (curve A) and a conventional HC-PCF (curve B)

The power induced degradation of conventional HC-PCFs and the advantageously longer life time of the inventive HC-PCF are further illustrated in FIGS. 4 and 5. FIGS. 4A and 4B show SEM images of the input side of conventional HC-PCFs that have been exposed for about >100 Wh to a pump light field. The inventors have found that this pronounced degradation of the cladding structure results from plasma-enhanced erosion, wherein the plasma is formed because of field enhancement at the sharp gas-glass-interfaces at the fiber input side. As a consequence of the degradation, the average output power of the conventional HC-PCF strongly decreases already after several 10's of Wh (see FIG. 5, dashed curve B). Testing the inventive HC-PCF in a nonlinear experiment, a dramatic improvement of the lifetime is obtained (see FIG. 5, solid curve A). According to FIG. 5, that exposures>1000 Wh are feasible, with extrapolated values of several 1000 Wh.

Figure 6:
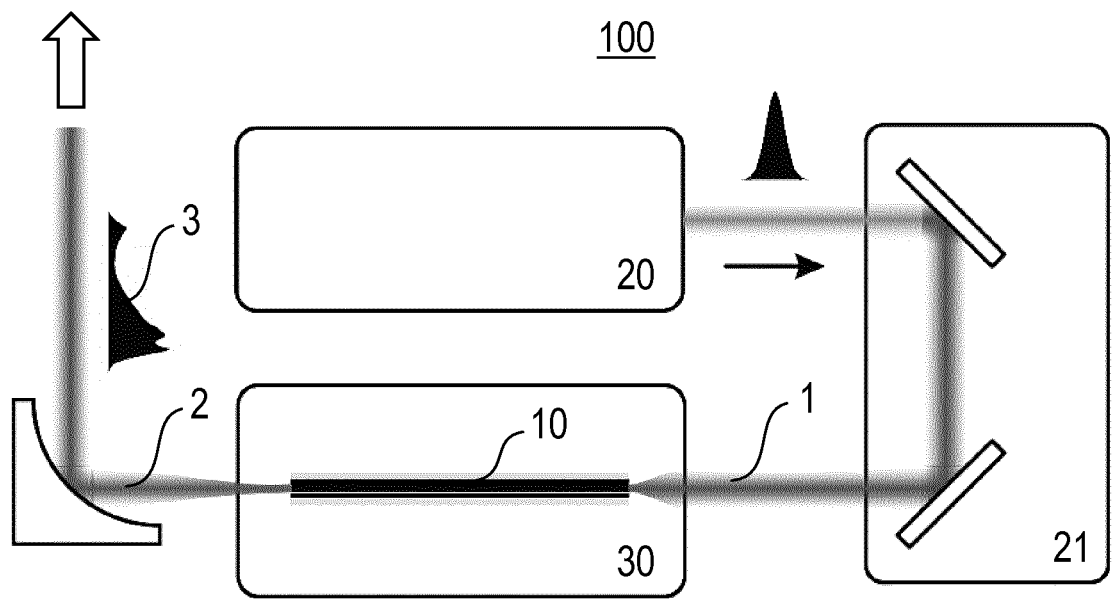
FIG. 6: a schematic illustration of a light source device including a HC-PCF according to the invention.

An embodiment of a broadband, high-brightness light source 100 including the inventive HC-PCF 10 is illustrated in FIG. 6. Such light sources 100 preferably are used in applications where long lifetime is highly desired, such as optical metrology (e.g. for semiconductor industry), UV microscopy or spectroscopy.

Figure 7:
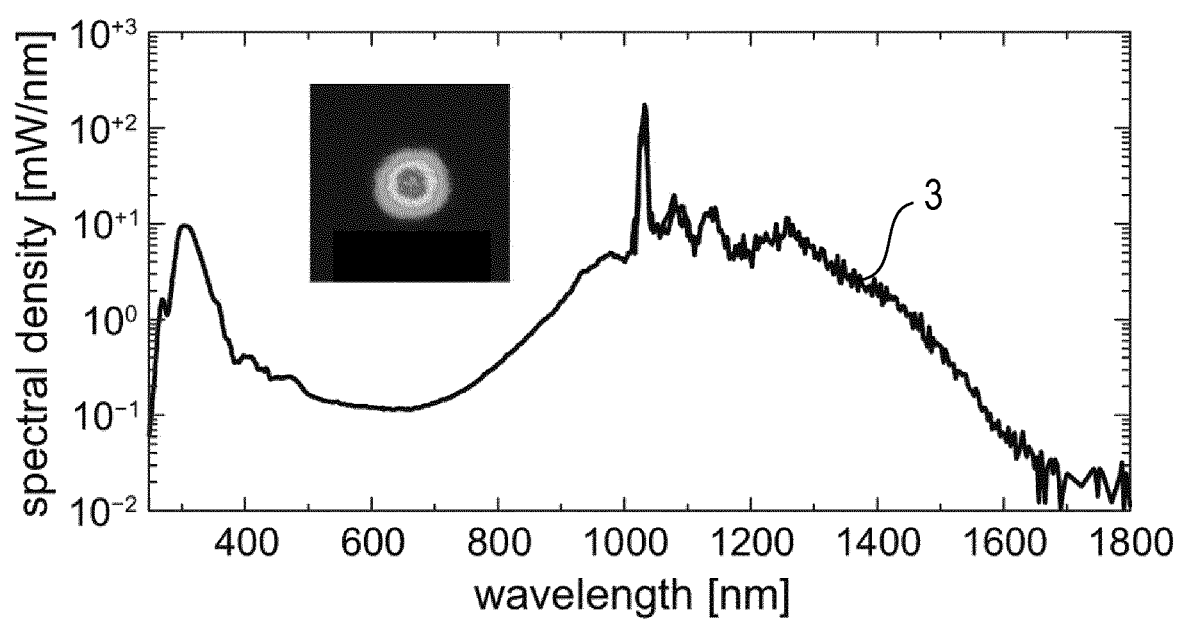
FIG. 7: a measured output spectrum of a HC-PCF according to the invention.
Figure 8:
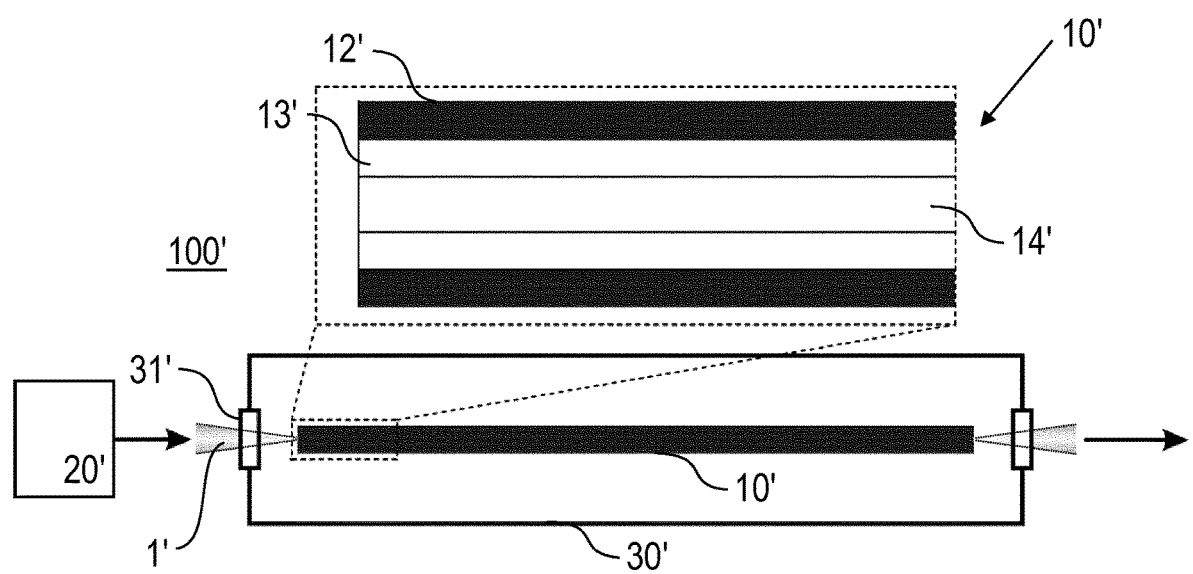
FIGS. 8 and 9: a schematic illustration of a HC-PCF based light source including a conventional HC-PCF and an SEM image of the input side of a conventional HC-PCF.

The light source 100 comprises a pump source 20, an optional stabilization unit 21, the HC-PCF 10 placed in a gas cell 30 and optional additional output optics 22. The pump source 20 is a pulse laser creating the pulsed light field 1, e. g. with μJ-level energy and sub-ps pulse duration, in particular 10 μJ energy and 300 fs pulse duration with a central wavelength 1030 nm. The stabilization unit 21 is provided for stabilizing the spatial position of the pulse output from the pump source 20. The pump pulses are launched into the gas-filled inventive HC-PCF 10. The gas cell includes e. g. Ar at 30 bar. The pulses are subjected to spectral broadening in the HC-PCF 10 and the broadband output 2 is collimated with the output optics 22 and delivered to an application. An example spectrum 3 of such a light source is shown in FIG. 7, ranging from about 240 to 1700 nm. The inset of FIG. 7 shows the measured beam cross-section of the output 2 (1/$e^2$ diameter 3.9 mm at 570 nm), indicating a very high beam quality.

Alternatively, the HC-PCF 10 can be used for a linear light transmission, e. g. from a laser source creating cw or pulsed laser light for material processing to an application site, e. g. a work piece.

The HC-PCF 10, e. g. according to FIG. 1, is manufactured by heating a fiber section of a HC-PCF with a fusion splicer for a heating time of 300 ms to a temperature above the glass transition temperature of e. g. 1200° C. (for fused silica). The fiber section has a length of e. g. 500 μm. The taper shape is formed by reducing the temperature from the centre of the heated fiber section to the ends thereof or simply by the temperature field created by a centre heating of the fiber section. Subsequently, the fiber section is cut after cooling.

The features of the invention disclosed in the above description, the drawings and the claims can be of significance individually, in combination or sub-combination for the implementation of the invention in its different embodiments.

The invention claimed is:

1. A hollow-core photonic crystal fiber (HC-PCF), being configured for guiding at least one mode of a light field along a mode guiding section of the HC-PCF, comprising:
   an outer jacket, an inner cladding, and a hollow core, that extend along the HC-PCF, wherein:
   the inner cladding is arranged on an interior surface of the outer jacket and comprises anti-resonant structures surrounding the hollow core, and
   the hollow core has a mode guiding core diameter (d) provided along the mode guiding section of the HC-PCF,
   wherein at least one fiber end of the HC-PCF has a light field coupling section in which the hollow core is tapered over an axial coupling section length from a fiber end core diameter (D) at the at least one fiber end to the mode guiding core diameter (d),
   wherein the outer jacket has a constant thickness, and
   wherein the inner cladding thickness decreases towards an opening of the at least one fiber end.

2. The hollow-core photonic crystal fiber of claim 1, wherein:
   the anti-resonant structures have a cross-sectional dimension that gradually increases in the light field coupling section towards the mode guiding section.

3. The hollow-core photonic crystal fiber of claim 1, wherein:
   the fiber end core diameter (D) and the axial coupling section length are selected such that an overlap of the inner cladding and the light field to be focused to the hollow core for guiding by the HC-PCF is excluded or negligible at the fiber end.

4. The hollow-core photonic crystal fiber of claim 1, wherein:
   the axial coupling section length of the light field coupling section is at least the mode guiding core diameter (d) and/or at most a transition dimension ($\pi(D^2d^2-d^4)^{0.5}/(4\lambda)$), where λ is the central wavelength of the light field.

5. The hollow-core photonic crystal fiber of claim 4, wherein:
   the axial coupling section length of the light field coupling section is at least 20 μm and/or at most 5000 μm.

6. The hollow-core photonic crystal fiber of claim 1, wherein:
   the anti-resonant structures have rounded ends facing toward the at least one fiber end.

7. The hollow-core photonic crystal fiber of claim 1, wherein:
   the inner cladding extends to an opening of the at least one fiber end.

8. The hollow-core photonic crystal fiber of claim 1, wherein:
   the light field coupling section is provided at an incoupling end of the HC-PCF only.

9. The hollow-core photonic crystal fiber of claim 1, wherein:
the HC-PCF is configured to subject a light field to an optically nonlinear process, in particular spectral broadening, or
the HC-PCF is configured to deliver a light field to an application site.

10. The hollow-core photonic crystal fiber of claim 1, wherein
the light field coupling section is formed by thermal treatment of the HC-PCF.

11. The hollow-core photonic crystal fiber of claim 10, wherein:
resonant structures of the inner cladding are softened and the light field coupling section is formed by the effect of surface tension in the softened anti-resonant structures.

12. The hollow-core photonic crystal fiber of claim 11, wherein:
the thermal treatment comprises a heating of the HC-PCF such that the resonant structures of the inner cladding are softened and the light field coupling section is formed by the combined effect of surface tension in the softened anti-resonant structures and an applied vacuum in at least one of the anti-resonant structures.

13. The hollow-core photonic crystal fiber method of claim 11, wherein:
the thermal treatment comprises a heating of the HC-PCF such that the resonant structures of the inner cladding are softened and the light field coupling section is formed by the combined effect of surface tension in the softened anti-resonant structures and an applied pressure in the mode guiding core.

14. A hollow-core photonic crystal fiber (HC-PCF), being configured for guiding at least one mode of a light field along a mode guiding section of the HC-PCF, comprising:
an outer jacket, an inner cladding, and a hollow core, that extend along the HC-PCF, wherein:
the inner cladding is arranged on an interior surface of the outer jacket and comprises anti-resonant structures surrounding the hollow core, and
the hollow core has a mode guiding core diameter (d) provided along the mode guiding section of the HC-PCF,
wherein at least one fiber end of the HC-PCF has a light field coupling section in which the hollow core is tapered over an axial coupling section length from a fiber end core diameter (D) at the at least one fiber end to the mode guiding core diameter (d), and
wherein an axial transition length over which the fiber core diameter dimension reduces in the light field coupling section from the fiber end core diameter (D) to (0.5*(D+d)) is at least 0.5 times the mode guiding core diameter (d) and/or at most 0.5 times a transition dimension $(\pi(D^2 d^2 - d^4)^{0.5}/(4\lambda))$, where $\lambda$ is the central wavelength of the light field.

15. The hollow-core photonic crystal fiber of claim 14, wherein:
the axial transition length is at least 10 μm and/or at most 1000 μm.

16. A hollow-core photonic crystal fiber (HC-PCF), being configured for guiding at least one mode of a light field along a mode guiding section of the HC-PCF, comprising:
an outer jacket, an inner cladding, and a hollow core, that extend along the HC-PCF, wherein:
the inner cladding is arranged on an interior surface of the outer jacket and comprises anti-resonant structures surrounding the hollow core, and
the hollow core has a mode guiding core diameter (d) provided along the mode guiding section of the HC-PCF,
wherein at least one fiber end of the HC-PCF has a light field coupling section in which the hollow core is tapered over an axial coupling section length from a fiber end core diameter (D) at the at least one fiber end to the mode guiding core diameter (d), and
wherein the inner cladding does not extend to an opening of the at least one fiber end.

* * * * *